S. H. BARTLETT & I. P. MARKHAM.
NUT LOCK.
APPLICATION FILED OCT. 2, 1915.

1,174,802.

Patented Mar. 7, 1916.

Witnesses

Inventors
S. H. Bartlett,
I. P. Markham.
By
Attorney

UNITED STATES PATENT OFFICE.

SYLVENUS H. BARTLETT AND ISAAC P. MARKHAM, OF ELLICOTTVILLE, NEW YORK.

NUT-LOCK.

1,174,802. Specification of Letters Patent. Patented Mar. 7, 1916.

Application filed October 2, 1915. Serial No. 53,826.

*To all whom it may concern:*

Be it known that we, SYLVENUS H. BARTLETT and ISAAC P. MARKHAM, citizens of the United States, residing at Ellicottville, in the county of Cattaragus and State of New York, have invented certain new and useful Improvements in Nut-Locks; and we do hereby declare the following to be a full, clear, and exact description of the invention, such as will enable others skilled in the art to which it appertains to make and use the same.

This invention has for its object to provide a simple and efficient nut lock embodying essentially a nut having eccentric or wedge shaped grooves or recesses in the bore thereof receiving a plurality of various sized balls adapted to co-act with the inclined wall of the eccentric groove to lock the nut and bolt against rotational movement in one direction.

Another object is the provision of locking means for the nut independent of the balls which may be adjusted immediately after adjustment of the latter to lock the latter against rotational movement and thus insure against accidental movement of the nut relative to the bolt before the balls have moved into wedging or locking position in the grooves.

Figure 1:
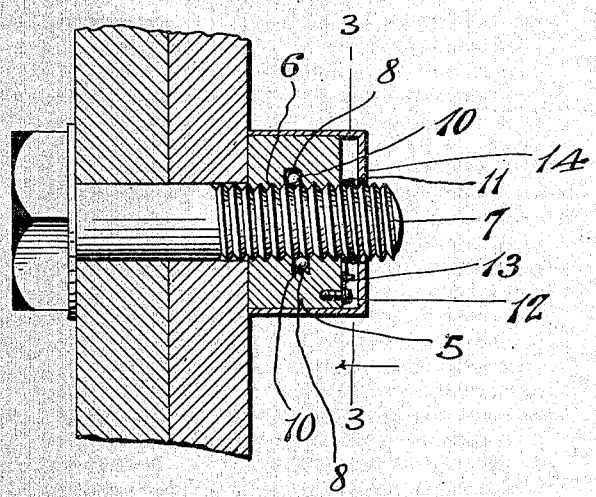
Figure 2:
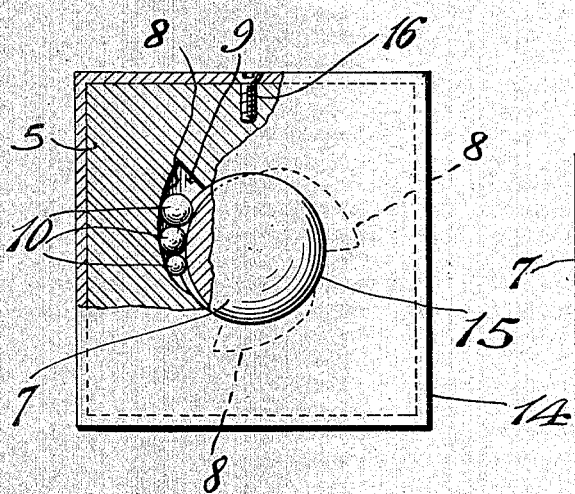
Figure 3:
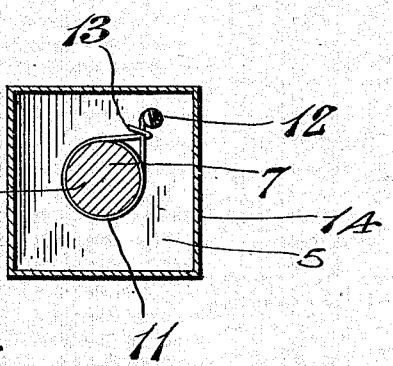

With these and other objects in view, the invention consists in the novel construction, arrangement and formation of parts as will be hereinafter described, claimed and illustrated in the accompanying drawing, in which:

Figure 1 represents a longitudinal sectional view through the improved nut lock, Fig. 2 represents an end elevation thereof, partly in section, and Fig. 3 represents a transverse sectional view on the line 3—3 of Fig. 1.

Referring to the drawing in detail, wherein similar reference numerals designate corresponding parts throughout the several views, the numeral 5 indicates a nut of the usual or any preferred construction having the usual internally screwthreaded bore 6 receiving the threaded extremity of the bolt 7. Intermediate its ends, the wall of the bore 6 is formed with a plurality, preferably three, wedge shaped or eccentric grooves or recesses 8 which merge at one end in the wall of the bore and terminate at their opposite ends in shoulders 9 disposed radially of the bore of the nut.

A plurality of locking balls 10 is mounted in each of the grooves or recesses 8. As clearly illustrated in Fig. 2, preferably three balls 10 are arranged in each groove or recess 8 and each of the balls is of a different shape, being gradually decreased in diameter from the relatively large to the small end of the groove or recess. The sizes of the several balls are so proportioned that when the bolt 7 is fitted into the nut 5 each of the balls will wedge between the threads of the bolt and the inclined outer wall of the recess or groove 8 and each of the balls is spaced from the other to insure positive independent wedging thereof.

In order to temporarily lock the nut against rotational movement immediately after its adjustment upon the bolt 7 and possibly before the balls have moved to their wedging position, a wire 11 formed of a suitable flexible metal is secured by a screw 12 or equivalent means to the outer face of the nut 5 and, is adapted, subsequent to adjustment of the nut, to be wrapped three or more times about the bolt 7 adjacent the outer face of the nut 5 and the free end thereof is hooked or bent over the thick end of the wire, as indicated at 13.

A protective housing 14 shaped conformably with the nut 5 and having a central aperture 15 of adequate size to receive the bolt 7 is positioned over the nut 5 and is removably secured in position thereon by screws 16, or equivalent means.

What we claim is:

1. A nut lock including a nut having a screwthreaded bore and eccentric grooves or recesses formed in the wall of said bore, and a plurality of various sized locking balls arranged in said grooves.

2. A nut lock including a nut having an internally screwthreaded bore and a plurality of eccentric grooves or recesses formed in the wall of the bore thereof, and a plurality of spaced various sized locking balls arranged in said grooves.

In testimony whereof we affix our signatures in presence of two witnesses.

SYLVENUS H. BARTLETT.
ISAAC P. MARKHAM.

Witnesses:
 GUY FRENCH,
 J. MILTON JUNKER.